US012646799B2

(12) United States Patent
Lin et al.

(10) Patent No.: US 12,646,799 B2
(45) Date of Patent: Jun. 2, 2026

(54) BATTERY SEPARATOR INCLUDING ZEOLITE COATING POSITIONED WITHIN INTER-PARTICLE PORES OF SUBSTRATE, LITHIUM-ION BATTERY, AND METHOD OF MAKING THE SAME

(71) Applicant: Arizona Board of Regents on behalf of Arizona State University, Scottsdale, AZ (US)

(72) Inventors: Jerry Lin, Scottsdale, AZ (US); Kishen Rafiz, Tempe, AR (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 623 days.

(21) Appl. No.: 18/008,032

(22) PCT Filed: Jun. 2, 2021

(86) PCT No.: PCT/US2021/035491
§ 371 (c)(1),
(2) Date: Dec. 2, 2022

(87) PCT Pub. No.: WO2021/247736
PCT Pub. Date: Dec. 9, 2021

(65) Prior Publication Data
US 2023/0238644 A1 Jul. 27, 2023

Related U.S. Application Data

(60) Provisional application No. 63/033,622, filed on Jun. 2, 2020.

(51) Int. Cl.
*H01M 50/383* (2021.01)
*H01M 10/0525* (2010.01)
(Continued)

(52) U.S. Cl.
CPC ..... *H01M 50/383* (2021.01); *H01M 10/0525* (2013.01); *H01M 50/403* (2021.01);
(Continued)

(58) Field of Classification Search
CPC ............. H01M 50/383; H01M 50/489; H01M 50/403; H01M 50/449; H01M 50/434; H01M 50/431; H01M 10/0525
(Continued)

(56) References Cited

U.S. PATENT DOCUMENTS 9,882,191 B2   1/2018   Hasegawa et al.
10,472,571 B2   11/2019   Zhang et al.
(Continued)

FOREIGN PATENT DOCUMENTS

CN   103887473 A   6/2014
CN   104934578 A   *   9/2015   ............ H01M 4/364
(Continued)

OTHER PUBLICATIONS

Chen et al., Zeolitic imidazolate framework-67 based separator for enhanced high thermal stability of lithium ion battery, Aug. 2018, Journal of Power Sources, 400, 325-332 (Year: 2018).*
(Continued)

*Primary Examiner* — Sean P Cullen
(74) *Attorney, Agent, or Firm* — Fish & Richardson P.C.

(57) ABSTRACT
A lithium-ion battery separator includes a substrate defining inter-particle pores and a zeolite coating on a surface of the substrate. The zeolite coating includes zeolite particles. The zeolite particles are hydrophobic and have an average diameter smaller than an average pore size of inter-particle pores of the substrate, such that some of the zeolite particles are positioned in some of the inter-particle pores. The separator is non-flammable. In a lithium-ion battery, the substrate is a first electrode, and a second electrode is in direct contact
(Continued)

with the zeolite coating. The lithium-ion battery includes a non-flammable salt-concentrated electrolyte, and the zeolite coating has a high wettability for the electrolyte. The lithium-ion battery is non-flammable.

21 Claims, 5 Drawing Sheets

(51) Int. Cl.
| | |
|---|---|
| *H01M 50/403* | (2021.01) |
| *H01M 50/431* | (2021.01) |
| *H01M 50/434* | (2021.01) |
| *H01M 50/449* | (2021.01) |
| *H01M 50/489* | (2021.01) |

(52) U.S. Cl.
CPC ....... *H01M 50/431* (2021.01); *H01M 50/434* (2021.01); *H01M 50/449* (2021.01); *H01M 50/489* (2021.01)

(58) Field of Classification Search
USPC .......................... 429/209, 251, 254, 341, 252
See application file for complete search history.

(56) References Cited

U.S. PATENT DOCUMENTS

| | | | |
|---|---|---|---|
| 2011/0003209 A1 | 1/2011 | Katayama | |
| 2012/0088129 A1* | 4/2012 | Kaneda ............. | H01M 10/0525 |
| | | | 429/59 |
| 2016/0101415 A1 | 4/2016 | Ji et al. | |
| 2018/0043656 A1 | 2/2018 | Song | |
| 2018/0254449 A1 | 9/2018 | Xiao et al. | |
| 2019/0229318 A1* | 7/2019 | Xiao ................... | H01M 50/491 |
| 2019/0348657 A1 | 11/2019 | Frischmann et al. | |

FOREIGN PATENT DOCUMENTS

| | | | | |
|---|---|---|---|---|
| CN | 106981606 A | 7/2017 | | |
| JP | 2009224341 A | 10/2009 | | |
| JP | 2019535115 A | 12/2019 | | |
| JP | 2023509836 A | 3/2023 | | |
| KR | 20180071884 A | * 6/2018 | .......... | H01M 2/1646 |
| RU | 2554945 C2 | 7/2015 | | |
| WO | 2019246263 A1 | 12/2019 | | |

OTHER PUBLICATIONS

Rafiz et al., Safe Li-ion batteries enabled by completely inorganic electrode-coated silicalite separators, Sep. 2020, Sustainable Energy Fuels, 4, 5783-5794 (Year: 2020).*
"some." In New Oxford American Dictionary, edited by Stevenson, Angus, and Christine A. Lindberg. : Oxford University Press, 2010. https://www.oxfordreference.com/view/10.1093/acref/9780195392883. 001.0001/m_en_us1292317. (Year: 2010).*
Martin, Elizabeth. "zeolite." In The New Oxford Dictionary for Scientific Writers and Editors. : Oxford University Press, 2009. https://www.oxfordreference.com/view/10.1093/acref/9780199545155. 001.0001/acref-9780199545155-e-10565. (Year: 2009).*
Schaschke, Carl. "zeolite." In A Dictionary of Chemical Engineering. : Oxford University Press, 2014. https://www.oxfordreference. com/view/10.1093/acref/9780199651450.001.0001/acref-9780199651450-e-3237. (Year: 2014).*
Lapomnik et al., Manganese modified zeolite silicalite-1 as polysulphide sorbent in lithium sulphur batteries, Jan. 2015, Journal of Power Sources, 274, 1239-1248 (Year: 2015).*
Federal Institute of Industrial Property (FIPS) Search Report for Russian App. No. 2022135092—both Russian and English translation, mailed on Sep. 27, 2024, 5 pages.

Official Action in Russian App. No. 2022135092—both Russian and English translation, mailed on Sep. 27, 2024, 11 pages.
Supplementary European Search Report; Ep Application No. 21818254; European Patent Office; Feb. 3, 2025 (11 pages).
Tarascon, J. M. & Armand, M. Issues and challenges facing rechargeable lithium batteries. Nature 414, 359-367, doi: Doi 10.1038/35104644 (2001).
Kong, L. X., Li, C., Jiang, J. C. & Pecht, M. G. Li-Ion Battery Fire Hazards and Safety Strategies. Energies 11, doi: ARTN 2191 10.3390/en11092191 (2018).
Wang, Q. S. et al. Thermal runaway caused fire and explosion of lithium ion battery. Journal of Power Sources 208, 210-224, doi:10.1016/j.jpowsour.2012.02.038 (2012).
Perea, A. et al. State of charge influence on thermal reactions and abuse tests in commercial lithium-ion cells. Journal of Power Sources 399, 392-397, doi:10.1016/j.jpowsour.2018.07.112 (2018).
Roth, E. P. How Electrolytes Influence Battery Safety. The Electrochemical Society Interface 21, 45-49 (2012).
Chawla, N., Bharti, N. & Singh, S. Recent Advances in Non-Flammable Electrolytes for Safer Lithium-Ion Batteries. Batteries-Basel 5, doi:ARTN 1910.3390/batteries5010019 (2019).
Wang, X. High-Concentration Trimethyl Phosphate-Based Non-flammable Electrolytes with Improved Charge-Discharge Performance of a Graphite Anode for Lithium-Ion Cells. J Electrochem Soc 153, 135-139 (2006).
Janek, J. & Zeier, W. G. A solid future for battery development. Nature Energy 1, 16141, doi:10.1038/nenergy.2016.141 (2016).
u, K. Electrolytes and Interphases in Li-Ion Batteries and Beyond. Chem Rev 114 (23), 11503-11618, doi:10.1021/cr500003w (2014).
Wang, J. et al. Fire-extinguishing organic electrolytes for safe batteries. Nature Energy 3, 22-29, doi:10.1038/s41560-017-0033-8 (2018).
Jeong, S.-K. et al. Suppression of dendritic lithium formation by using concentrated electrolyte solutions. Electrochem Commun 10, 635-638, doi:https://doi.org/10.1016/j.elecom.2008.02.006 (2008).
Ma, Q. et al. Improved Cycling Stability of Lithium-Metal Anode with Concentrated Electrolytes Based on Lithium (Fluorosulfonyl)(trifluoromethanesulfonyl)imide. Chemelectrochem 3, 531-536, doi:10.1002/celc.201500520 (2016).
Soto, F. A., Ma, Y., Martinez de la Hoz, J. M., Seminario, J. M. & Balbuena, P. B. Formation and Growth Mechanisms of Solid-Electrolyte Interphase Layers in Rechargeable Batteries. Chemistry of Materials 27, 7990-8000, doi:10.1021/acs.chemmater.5b03358 (2015).
M.H, R. Mussel-inspired polydopamine-treated polyethylene separators for high-power Li-ion batteries. Advanced Materials 23, 3066-3070 (2011).
Yamada, Y., Wang, J., Ko, S., Watanabe, E. & Yamada, A. Advances and issues in developing salt-concentrated battery electrolytes. Nature Energy 4, 269-280, 427 doi:10.1038/s41560-019-0336-z (2019).
Jiang, W. et al. A high temperature operating nanofibrous polyimide separator in Li-ion battery. Solid State Ionics 232, 44-48, doi:https://doi.org/10.1016/j.ssi.2012.11.010 (2013).
Carvalho, D. V., Loeffler, N., Kim, G. T. & Passerini, S. High Temperature Stable Separator for Lithium Batteries Based on SiO2 and Hydroxypropyl Guar Gum. Membranes-Basel 5, 632-645, doi:10.3390/membranes5040632 (2015).
Costa, C. M. et al. Silica/poly(vinylidene fluoride) porous composite membranes for lithium-ion battery separators. Journal of Membrane Science 564, 842-851, doi:10.1016/j.memsci.2018.07.092 (2018).
Dong, X. L., Mi, W. L., Yu, L. H., Jin, Y. & Lin, Y. S. Zeolite coated polypropylene separators with tunable surface properties for lithium-ion batteries. Micropor Mesopor Mat 226, 406-414, doi:10.1016/j.micromeso.2016.02.006 (2016).
Wang, Y., Wang, S. Q., Fang, J. Q., Ding, L. X. & Wang, H. H. A nano-silica modified polyimide nanofiber separator with enhanced thermal and wetting properties for high safety lithium-ion batteries. Journal of Membrane Science 537, 248-254, doi:10.1016/j.memsci. 2017.05.023 (2017).

(56) References Cited

OTHER PUBLICATIONS

Xie, J.-D. Sol-gel deposition of silica nanospheres onto polymeric separators for improved performance of Li-ion batteries. Journal of the Taiwan Institute of Chemical Engineers 81, 199-205 (2017).

Yu, L. H., Jin, Y. & Lin, Y. S. Ceramic coated polypropylene separators for lithium-ion batteries with improved safety: effects of high melting point organic binder. Rsc Adv 6, 40002-40009, doi:10. 1039/c6ra04522g (2016).

Kanhere et al, N. Electrode-coated alumina separators for lithium-ion batteries—effect of particle size and distribution of alumina powders. Powder Technol 353, 230-237 (2019).

Sharma, G., Jin, Y. & Lin, Y. S. Lithium Ion Batteries with Alumina Separator for Improved Safety. J Electrochem Soc 164, A1184-A1191, doi:10.1149/2.1091706jes (2017).

Jiang, Y. X. et al. A novel composite microporous polymer electrolyte prepared with molecule sieves for Li-ion batteries. Journal of Power Sources 160, 1320-1328, doi:10.1016/j.jpowsour.2006.02. 029 (2006).

Nunes-Pereira, J. Microporous membranes of NaY zeolite/poly (vinylidene fluoride-trifluoroethylene) for Li-ion battery separators. Journal of Electroanalytical Chemistry 689, 223-232 (2013).

Xiao, W., Gao, Z. G., Wang, S. L., Liu, J. G. & Yan, C. W. A novel NaA-type zeolite-embedded composite separator for lithium-ion battery. Mater Lett 145, 177-179, doi:10.1016/j.matlet.2015.01.102 (2015).

Huang, X. Separator technologies for lithium-ion batteries. J Solid State Electr 15.4, 649-662 (2011).

Buchberger, I. et al. Aging Analysis of Graphite/LiNi1/3Mn1/3Co1/3O2 Cells Using XRD, PGAA, and AC Impedance. J Electrochem Soc 162, A2737-A2746, doi:10.1149/2.0721514jes (2015).

Motuzas, J., Julbe, A., Noble, R. D., van der Lee, A. & Beresnevicius, Z. J. Rapid synthesis of oriented silicalite-1 membranes by microwave-assisted hydrothermal treatment. Micropor Mesopor Mat 92, 259-269, doi: 10.1016/j.micromeso.2006.01.014 (2006).

Xomeritakis, G. T., Michael Permeation of aromatic isomer vapors through oriented MFI-type membranes made by secondary growth. Chemistry of materials 11.4, 875-878 (1999).

He, M. N., Zhang, X. J., Jiang, K. Y., Wang, J. & Wang, Y. Pure Inorganic Separator for Lithium Ion Batteries. Acs Appl Mater Inter 7, 738-742, doi:10.1021/am507145h (2015).

Abraham, K.M., Prospects and Limits of Energy Storage in Batteries, J. Phys. Chem. Lett., 6, 830-844, doi:10.1021/z5026273 4120(2015).

Cho, Tae-Hyung, et al. "Composite nonwoven separator for lithium-ion battery: Development and characterization." Journal of Power Sources (2010).

Xiang, Hongfa, et al. Journal of Power Sources 196.20 (2011): 8651-8655.

De Leeuw et.al. Journal of the American Ceramic Society 82.11 (1999): 3209-2316.

Lei, Xue-gong, et al Photochemical & Photobiological Sciences 2.11 (2003): 1095-1100.

Olson, D. H., W. O. Haag, and R. M. Lago. Journal of Catalysis 61.2 (1980): 390-396.

Yu, L. H et al Rsc Adv 6 (2016): 40002-40009.

SS Zhang, ACS Appl Energ Mater 1 (3), 910 (2018).

XB Cheng et al., Chem Rev 117 (15), 10403 (2017).

E-G Shim et al., Electrochimica Acta 54 (8), 2276 (2009).

K Naoi et al., J Electrochem Soc 156 (4), A272 (2009).

Song, W., et al. Langmuir 20.11 (2004): 4696-4702.

https://pubchem.ncbi.nlm.nih.gov/compound/Lithium-fluoride#/ section=Spectral-Information, accessed Aug. 3, 2020.

Goumans et.al. Physical Chemistry Chemical Physics 9.17 (2007): 2146-2152.

Shi et al., "A highly concentrated phosphate-based electrolyte for high-safety rechargeable lithium batteries" Chem. Comm., Feb. 2018, 54: 4453-4456.

* cited by examiner

BATTERY SEPARATOR INCLUDING ZEOLITE COATING POSITIONED WITHIN INTER-PARTICLE PORES OF SUBSTRATE, LITHIUM-ION BATTERY, AND METHOD OF MAKING THE SAME

CROSS-REFERENCE TO RELATED APPLICATION

This application claims the benefit of U.S. Patent Application No. 63/033,622 entitled "FIRE-PROOF LITHIUM-ION BATTERY" and filed on Jun. 2, 2020.

TECHNICAL FIELD

This invention relates to a non-flammable electrode-supported zeolite separator and an organic electrolyte for a lithium-ion battery, as well as a lithium ion battery including electrolyte and the electrode-supported zeolite separator.

BACKGROUND

Lithium-ion batteries are rechargeable batteries that are commonly used in portable electronics and electric vehicles. Lithium-ion batteries can sometimes catch on fire and explode when subjected to electrical, thermal, or mechanical stress. Lithium-ion batteries typically have a limited cycle life over temperatures of 40° C. and can require extensive cooling to maintain operation below this temperature.

SUMMARY

This disclosure describes a non-flammable electrode-supported zeolite separator for Li-ion batteries, an organic electrolyte for lithium-ion (Li-ion) batteries, and Li-ion batteries including these components. Scalable blade-coating methods of fabricating the electrode-supported silicalite separators are also described.

In a first general aspect, a lithium-ion battery separator includes a substrate defining inter-particle pores and a zeolite coating on a surface of the substrate. The zeolite coating includes zeolite particles. The zeolite particles are hydrophobic and have an average diameter smaller than an average pore size of inter-particle pores of the substrate, such that some of the zeolite particles are positioned in some of the inter-particle pores.

Implementations of the first general aspect may include one or more of the following features.

In some implementations, the substrate includes a lithium nickel manganese cobalt oxide (NMC). The zeolite particles typically have a metal content of at least 99 atom % silicon. In one example, the zeolite particles are silicalite particles. An average pore size of the inter-particle pores can be between about 2.5 μm and about 2.8 μm, and an average particle diameter of the zeolite particles can be between about 1.5 μm and about 2.5 μm.

In some implementations, the zeolite coating is formed directly on the surface of the substrate. A thickness of the zeolite coating is typically in a range of 30 μm to 50 μm thick. The zeolite particles define inter-particle pores having an average pore size between about 600 nm and about 800 nm and intra-particle pores having an average pore size between about 0.5 nm and about 0.6 nm. The zeolite coating includes less than 1 wt % of organic components. A porosity of the zeolite particles is typically between 35% and 40%.

In a second general aspect, a lithium-ion battery includes the lithium-ion battery separator of the first general aspect, where the substrate is a first electrode. The lithium-ion battery includes a second electrode in direct contact with the zeolite coating, and an electrolyte in contact with the first electrode, the zeolite coating, and the second electrode. Implementations of the second general aspect may include one or more of the following features.

In some implementations, the electrolyte is non-flammable. The electrolyte is a salt-concentrated electrolyte that includes a salt dissolved in a solvent. Suitable solvents include trimethyl phosphate (TMP), tris(trifluoroethyl) phosphate (TFEP), triethyl phosphate (TEP), dimethyl methyl phosphonate (DMMP), diethyl ethylphosphonate (DEEP), or a combination thereof. Suitable salts include carbonates and and lithium bis-fluoro sulphonyl imide (LiFSI). The battery is non-flammable.

In a third general aspect, making the lithium-ion battery separator of the first general aspect includes forming a slurry comprising zeolite particles, blade coating the slurry on a substrate, and drying the slurry to yield the lithium-ion battery separator.

Implementations of the third general aspect may include one or more of the following features.

A metal content of the zeolite particles is at least 99 atom % silicon. The substrate can include a lithium nickel manganese cobalt oxide (NMC).

The electrode-supported zeolite separators have a porous crystalline structure with superior wettability to salt-concentrated electrolytes as compared to commercially used polymer separators. The higher wettability allows the electrolyte to access the anode and anode-separator interface more uniformly, resulting in a more uniform solid electrolyte interface (SEI) formation and easier access to the anode material. This can result in noticeably better electrochemical performance in terms of reduction in SEI and charge-transfer resistance, which in turn results in higher capacity retention for the separators.

Cells with the electrode-supported zeolite separators and salt-concentrated electrolyte also demonstrate stable performance at temperatures up to 65° C., and thus can provide stable performance under conditions of thermal stress. Due to their higher wettability, these electrode-supported zeolite separators facilitate more rapid wetting of the cathode, anode, and separator materials, thereby increasing the projected production rate of batteries with this salt-concentrated electrolyte.

Advantages of the non-flammable separators described herein include a high surface energy capable of a greater wetting angle and therefore better specific capacity retention. Li-ion batteries with these separators have a longer cycle life at elevated operation temperatures of and a faster charging rate than current Li-ion batteries. Li-ion batteries described herein are also less susceptible to overheating and thus typically require less complex cooling systems. Thus, these batteries can be produced for lower cost and are simpler to operate than current Li-ion batteries. Applications include Li-ion batteries for grid-scale energy storage, electric vehicles, power tools, and mobile communication purposes.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

Figure 1A:
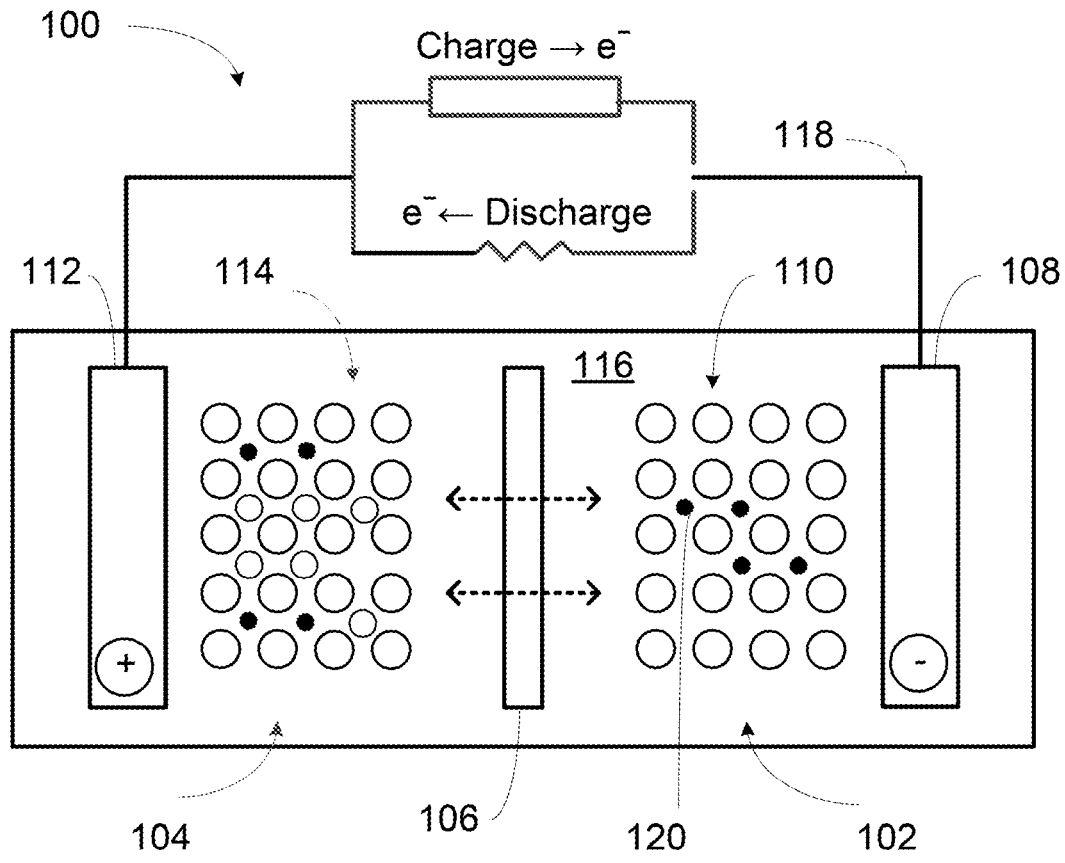
FIG. 1A depicts a lithium-ion battery.
Figure 1B:
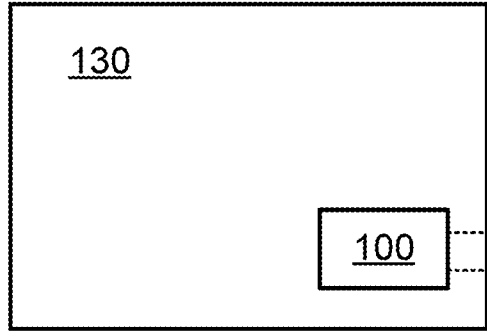
FIG. 1B depicts a device including a lithium-ion battery.

FIG. 1A depicts lithium-ion battery (LIB) 100 having anode 102 and cathode 104. Anode 102 and cathode 104 are separated by separator 106. Anode 102 includes anode collector 108 and anode material 110 in contact with the anode collector. Cathode 104 includes cathode collector 112 and cathode material 114 in contact with the cathode collector. Electrolyte 116 is in contact with anode material 110 and cathode material 114. Anode collector 108 and cathode collector 112 are electrically coupled via closed external circuit 118. Anode material 110 and cathode material 114 are materials into which, and from which, lithium ions 120 can migrate. During insertion (or intercalation) lithium ions move into the electrode (anode or cathode) material. During extraction (or deintercalation), the reverse process, lithium ions move out of the electrode (anode or cathode) material. When a LIB is discharging, lithium ions are extracted from the anode material and inserted into the cathode material. When the cell is charging, lithium ions are extracted from the cathode material and inserted into the anode material. The arrows in FIG. 1A depict movement of lithium ions through separator 106 during charging and discharging. FIG. 1B depicts device 130 with LIB 100. Device 130 may be, for example, an electric vehicle, an electronic device (e.g., a portable electronic device such as a cellular telephone, a tablet or laptop computer, etc.), or the like.

Embodiments described herein include an electrode-supported separator, in which a zeolite coating is formed directly on a first electrode (e.g., the cathode). The second electrode (e.g., the anode) is positioned so that the zeolite coating of the first electrode is in direct contact with a surface of the second electrode. Suitable zeolites include silicalite and other hydrophobic zeolites in which silicon accounts for at least 99 atom % of the total metal content of the zeolite.

Properties of silicalite make it especially advantageous for Li-ion battery separators. Silicalite has a higher surface energy ($\sim$4.6 J/m$^2$) than other materials (e.g., polypropylene, silica, and alumina) used for Li-ion battery separators. The higher surface energy enhances wettability of the separator by the electrolyte and increases uptake of the electrolyte by the separator. Silicalite also has intra-particle pores with an average diameter of about 0.5 nm to 0.6 nm that enhance wettability of the separator by the electrolyte and allow solvated lithium ions (e.g., in a phosphate solvent) to enter the pores. A porosity of silicalite is typically in a range of 35% to 40%. Silicalite is also lightweight, with a density of 1.8 g/cm$^3$, and therefore less dense than silica. In addition, silicalite separators can be entirely or almost entirely inorganic, and thus reducing the flammability attributed to organic (e.g., polymer) separators and organic-inorganic composite separators.

Silicalite can be synthesized by a sol-gel synthesis process from de-ionized water, tetraethyl orthosilicate (TEOS), and tetrapropylammonium hydroxide (TPAOH). In this process, water, TEOS (seed), and TPAOH (template) are combined in a selected ratio and then stirred until a clear solution is formed to ensure TEOS hydrolysis. The clear solution is autoclaved for a selected duration (e.g., between 18 hours and 24 hours) at a selected temperature (e.g., between 190° C. and 220° C.) to yield silicalite in a desired particle size (e.g., average diameter of 1.5 μm to 2.5 μm). The resulting silicalite powder is separated from the mother liquor using centrifuging and washing steps. The powder is dried and made into a slurry with water and a trace amount of binder (e.g., a polymer such as polyvinyl alcohol (PVA)). As used herein, "trace amount" generally refers to less than 1 wt % of the total solid weight of the slurry.

Figures 2, 4:
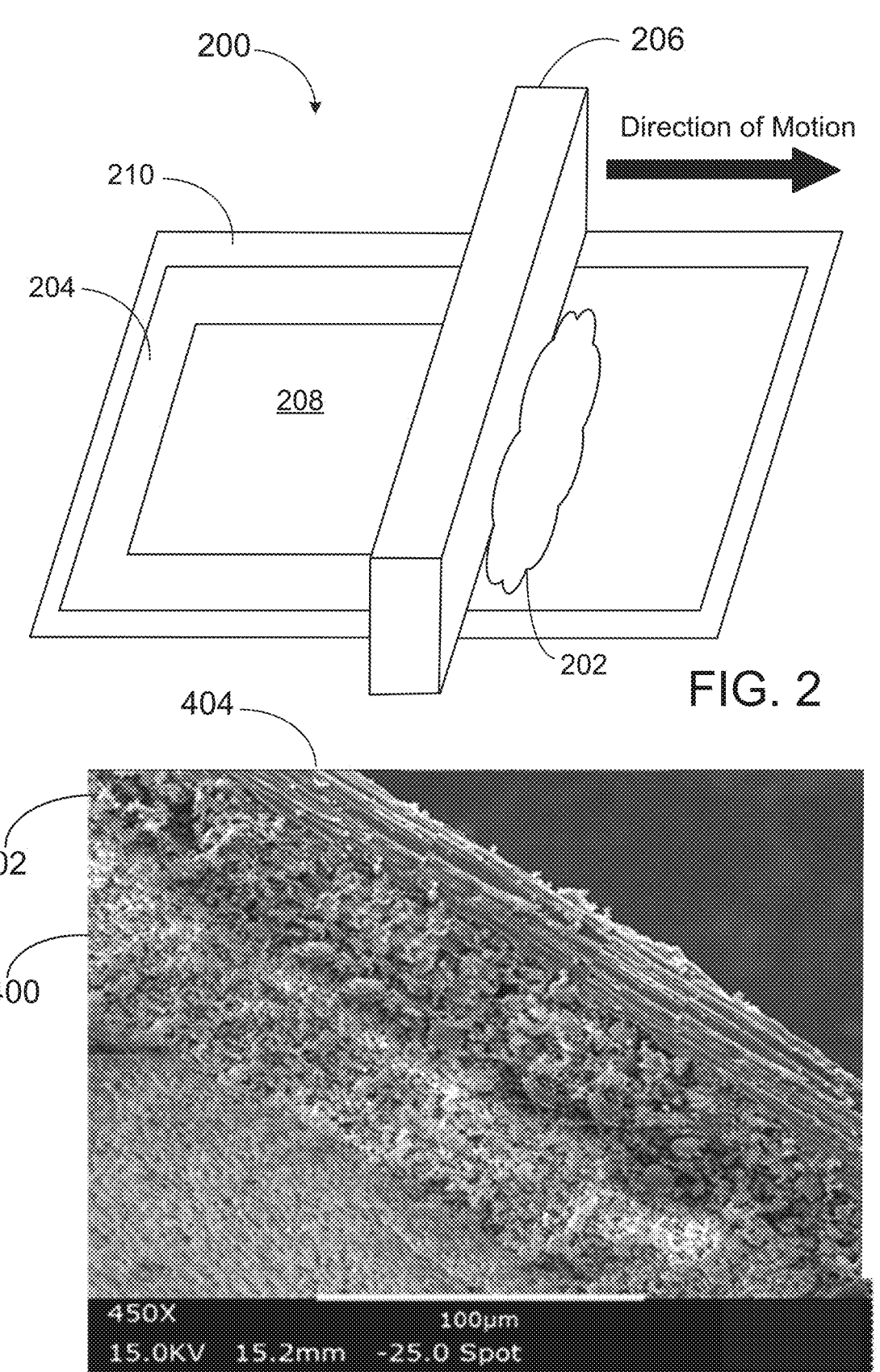
FIG. 2 depicts coating of an electrode with a zeolite slurry to yield an electrode-supported zeolite separator.
FIG. 4 is an image showing a cross-sectional view of a silicalite separator coated on a nickel manganese cobalt (NMC) electrode.

FIG. 2 depicts a blade coating process 200 in which silicalite slurry 202 on electrode 204 is spread by blade 206 to yield electrode-supported silicalite separator 208 on the electrode. In one example, electrode 204 is lithium nickel manganese cobalt oxide (LiNi$_{1/3}$Mn$_{1/3}$Co$_{1/3}$O$_2$) (NMC). In some embodiments the electrode 204 may be other NMC compositions such as LiNi$_{0.5}$Mn$_{0.3}$Co$_{0.2}$O$_2$ (NMC532 or NCM523), LiNi$_{0.6}$Mn$_{0.2}$Co$_{0.2}$O$_2$ (NMC622), or LiNi$_{0.8}$Mn$_{0.1}$Co$_{0.1}$O$_2$ (NMC811). The electrode 204 may be lithium iron phosphate (LiFePO$_4$), lithium cobalt oxide (LiCoO$_2$), lithium manganese oxide (LiMn$_2$O$_4$), or lithium nickel cobalt aluminum oxide (LiNiCoAlO$_2$, also referred to as "NCA"). In some cases, electrode 204 is supported by substrate 210 (e.g., a metal film). A blade-coating speed can be selected to yield a desired thickness of the silicalite layer (e.g., 30 μm to 50 μm). In some examples, a suitable blade-coating speed is between 3 cm/sec and 4 cm/sec. The silicalite particles are advantageously sized such that coating electrode 204 with the silicalite slurry 202 deposits silicate particles in inter-particle pores defined by the electrode material. In one example, pores in the NMC are in a between about 2.5 μm and about 2.8 μm, and the silicalite particles have an average particle diameter between about 1.5 μm and about 2.5 μm. The resulting silicalite layer is dried and the electrode is cut to a desired size. Drying the silicalite layer promotes silicalite inter-particle bonding as well as bonding between the silicalite particles and the electrode.

The particle size selection, together with the inter-particle pore size of silicalite particles (e.g., about ⅓ of the average silicalite particle diameter, or about 600 nm to about 800 nm) promotes a homogenous and crack-free coating on the electrode surface to provide electrical isolation from the anode. The particle size selection also allows the formation of a uniform silicalite coating with a low binder content (e.g., less than 1 wt % of the coating dry weight). At less than 1 wt % organic content, the separator is considered to be substantially inorganic, and thus less flammable than organic separators (e.g., polypropylene).

Suitable electrolytes include non-flammable salt-concentrated electrolytes such as 4M to 6M lithium bis(fluorosulfonyl)-imide (LiFSI) in trimethyl phosphate (TMP). The LiFSI/TMP electrolyte forms a clear solution with no precipitate of the salt even after standing for 24 hours. Thus, the salt is dissolved in the solvent. The LiFSI/TMP electrolyte has a high viscosity and does not efficiently wet a traditional polymer separator due to its low surface energy. However, the silicalite separator described herein has a high surface energy and thus can be wet by the LiFSI/TMP electrolyte.

This leads to the better specific capacity retention as compared to less wettable separators (e.g., silica and polypropylene). Other suitable non-flammable electrolytes include carbonate electrolytes dissolved in TMP and LiFSI dissolved in tris(trifluoroethyl) phosphate (TFEP), triethyl phosphate (TEP), dimethyl methyl phosphonate (DMMP), diethyl ethylphosphonate (DEEP), or a combination thereof.

Figure 3:
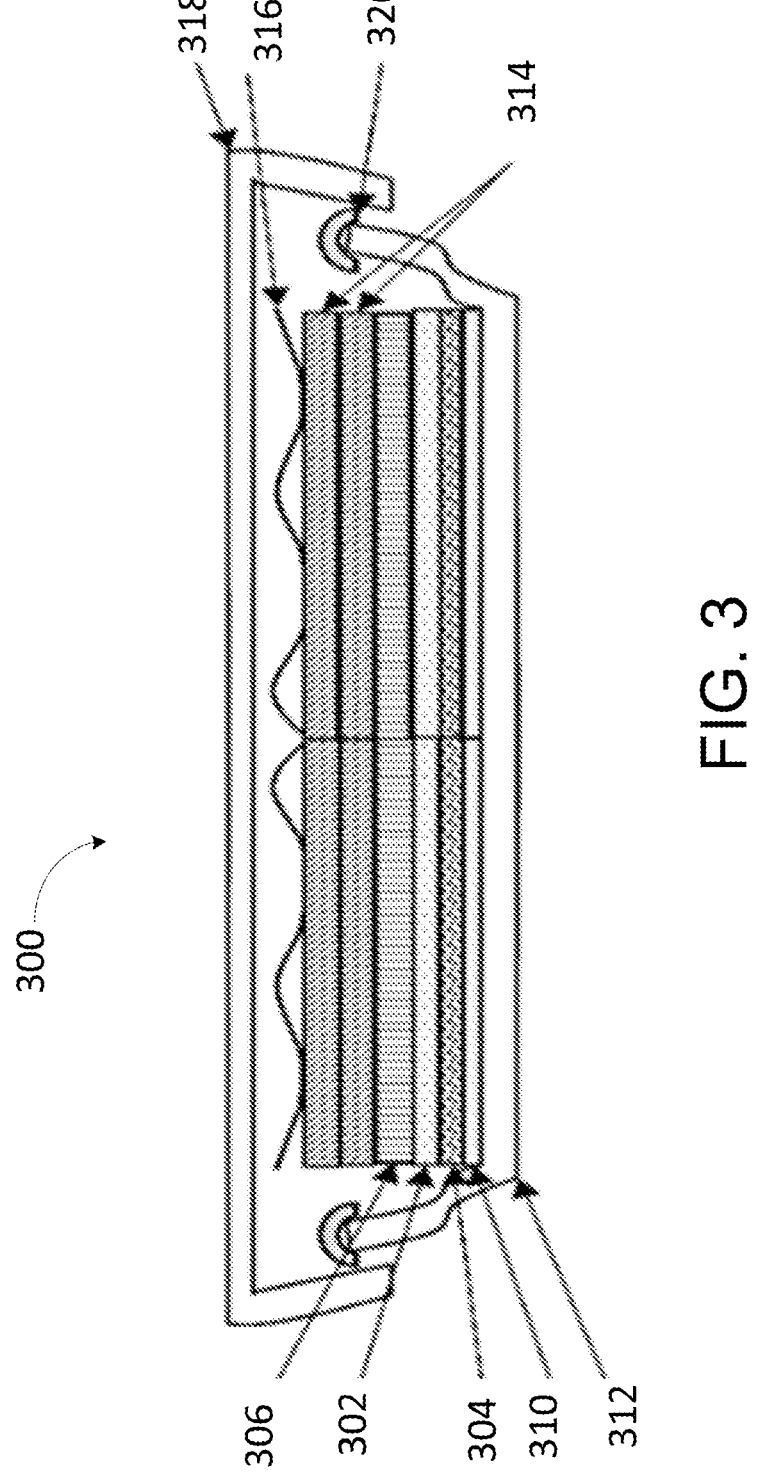
FIG. 3 is a cross-sectional view of a lithium-ion battery with an electrode-supported zeolite separator.

FIG. 3 is a cross-sectional view of coin cell Li-ion battery 300 with an electrode-supported separator 302. Electrode-supported separator 302 is formed directly on first electrode 304 and is in direct contact with second electrode 306. An electrolyte (e.g., a salt-concentrated electrolyte) fills the pores in separator 302 and contacts first electrode 304 and second electrode 306. Metal foil 310 is between first electrode 304 and negative case 312. Stainless steel spacers 314 and wavy spring 316 are between second electrode 306 and positive case 318. Spacers 320 provide electrical insulation between negative case 312 and positive case 318.

Separator 302 includes a substrate defining inter-particle pores and a zeolite coating on a surface of the substrate. The zeolite coating includes zeolite particles. The zeolite particles are hydrophobic and have an average diameter smaller than an average pore size of inter-particle pores of the substrate, such that some of the zeolite particles are positioned in some of the inter-particle pores.

In some implementations, the substrate includes a lithium nickel manganese cobalt oxide (NMC). The zeolite particles typically have a metal content of at least 99 atom % silicon. In one example, the zeolite particles are silicalite particles. An average pore size of the inter-particle pores can be between about 2.5 μm and about 2.8 μm, and an average particle diameter of the zeolite particles can be between about 1.5 μm and about 2.5 μm. The zeolite coating is formed directly on the surface of the substrate. A thickness of the zeolite coating is typically in a range of 30 μm to 50 μm thick. The zeolite particles define inter-particle pores having an average pore size between about 600 nm and about 800 nm and intra-particle pores having an average pore size between about 0.5 nm and about 0.6 nm. The zeolite coating includes less than 1 wt % of organic components. A porosity of the zeolite particles is typically between 35% and 40%.

The electrolyte is a salt-concentrated electrolyte that includes a salt dissolved in a solvent. Suitable solvents include trimethyl phosphate (TMP), tris(trifluoroethyl) phosphate (TFEP), triethyl phosphate (TEP), dimethyl methyl phosphonate (DMMP), diethyl ethyl phosphonate (DEEP), or a combination thereof. Suitable salts include carbonates and lithium bis-fluoro sulphonyl imide (LiFSI). The electrolyte, the separator, and the battery are non-flammable.

EXAMPLES

Materials, slurry preparation and electrolyte synthesis. Quartz silica (particle size ~2 μm) was obtained from US Nanomaterials Inc., and an aqueous silica slurry was prepared by mixing 5 gm of silica powder with 0.5 gm of 5 wt. % polyvinyl alcohol (PVA) aqueous solution (molecular weight: 77000-79000 Da) (ICN Biomedical Inc., USA) and 2 gm de-ionized water. Silicalite was synthesized using a hydrothermal synthesis method, in which 10 g of tri-ethyl orthosilicate (Millipore Sigma), 2.4 g of tetra-propyl ammonium hydroxide (Millipore Sigma) and 212 g of de-ionized water was stirred in a beaker for ~20 hours until a clear solution was achieved. This solution was then heated in an autoclave at 130° C. for 7 hours to achieve a particle size of ~2 μm. Subsequently, the mother liquor was decanted from the autoclave after reaction completion and room temperature cooling. The obtained silicalite powder was then washed by mixing it with de-ionized water and centrifuging the mixture at 16.8 m RCF (meter relative centrifugal force) to remove the organic components remaining after the reaction.

The powder was then dried at 120° C. under a vacuum to remove traces of moisture. The commercially used PP-2500 separator of 25 μm thickness was procured from Celgard for use as a control. NMC and graphite electrodes were procured from MTI Corporation. The components for constructing the CR-2032 cell were procured from X2 Labwares, Singapore. The lithium bis-fluoro sulphonyl imide (LiFSI) (battery grade) salt was procured from Kishida Chemical Corporation, Japan, and the tri-methyl phosphate solvent (TMP) (reagent grade; 99.999% purity) was procured from Millipore Sigma. Requisite weights of the LiFSI salt and TMP were mixed in a sealed glass bottle inside an atmosphere-controlled glovebox ($H_2O$<0.1 ppm, $O_2$<0.1 ppm) to have a salt concentration of 5.3 M. The obtained solution was left to rest for ~24 hours and checked to be a clear transparent liquid to ensure complete miscibility of the salt in the solvent.

Separator formation and characterization. The prepared slurry of silica or silicalite was dropped across one of the edges and then spread down the length of the aluminum foil or electrode using a caliper-adjustable doctor blade (Gardco LLC, USA). For producing the metal-oxide coated electrode-supported separators, the initial blade gap was kept at 50 μm. The coated separator was dried in a humidity controlled chamber at 40° C. and 60% relative humidity for 8 hours. The separator was then finally dried using a temperature controlled vacuum oven at 70° C. (Thermo Fisher Scientific, USA) for 12 hours to completely remove all traces of moisture. The thickness of coated separator was measured by a micrometer (Mitutoyo, Japan) with an accuracy of 1 μm. The final thickness was found to be 40 μm for both the separators, as about 10 μm compression was observed due to the drying of the separator.

In top view scanning electron microscopy (SEM) images of the homogenous silicalite separated coated on NMC electrodes, the formed coating of silicalite on the NMC electrode was found to be homogeneous and crack-free at various areas of viewing at both low and high magnification. The cross-sectional morphology of the coated separator was examined by scanning electronic microscopy (Philips, USA, FEI XL-30) of separator samples sputter-coated with gold to facilitate development of the micrographs. FIG. 4 shows a cross-sectional view with silicalite layer 400 formed directly on NMC electrode 402, which is supported by aluminum sheet 404. The top-view SEM images were quantified for particle size distribution using GATAN GMS software for particle size distribution with the particle size interval being 0.25 μm. EDX extension was used on the same SEM equipment to obtain elemental maps. X-ray diffraction patterns were obtained (Bruker, USA, AXS-D8, Cu Kα radiation) on NMC coated with silicalite to confirm the phase structure of the coated material. The coated aluminum foils were cut into 16 mm disks and tested for their pore size distribution using a mercury porosimeter (Micrometrics, USA). This characterization was done by coating the silicalite powder on aluminum foil rather than NMC so that the pore size distribution of the NMC does not interfere with the measurement of the pore size distribution of the respective powders. The mercury porosimetry was done at both highpressure mode and low-pressure mode to detect pore sizes ranging from the nanometer to micrometer dimensions.

Figure 5A:
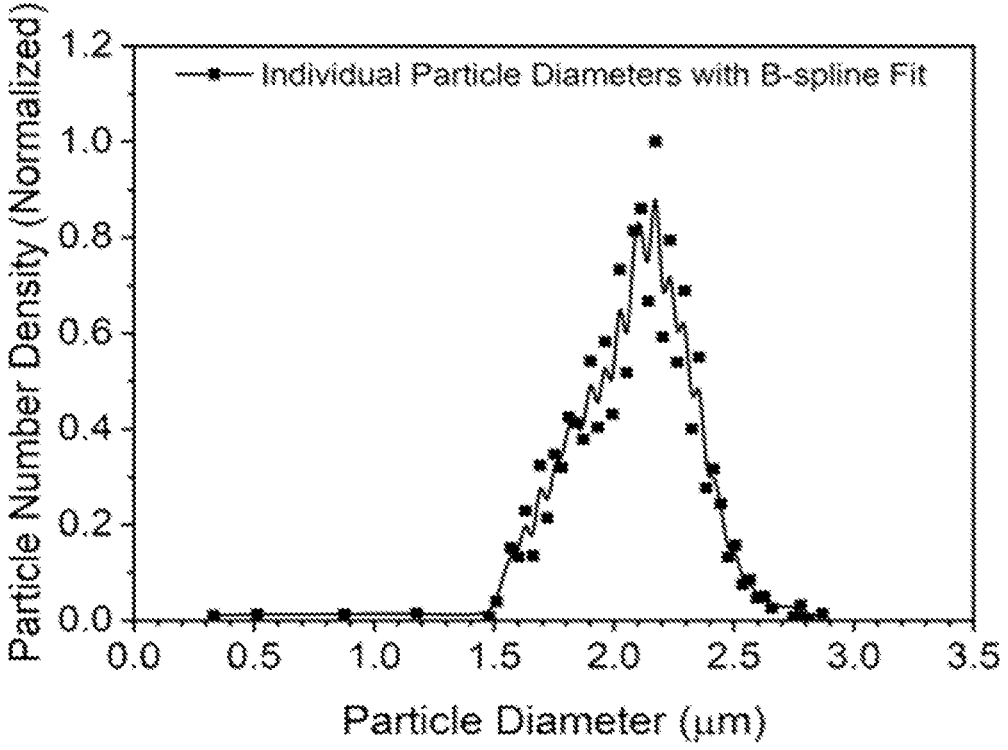
FIG. 5A shows a particle size distribution of silicalite used for an electrode-supported separator.
Figure 5B:
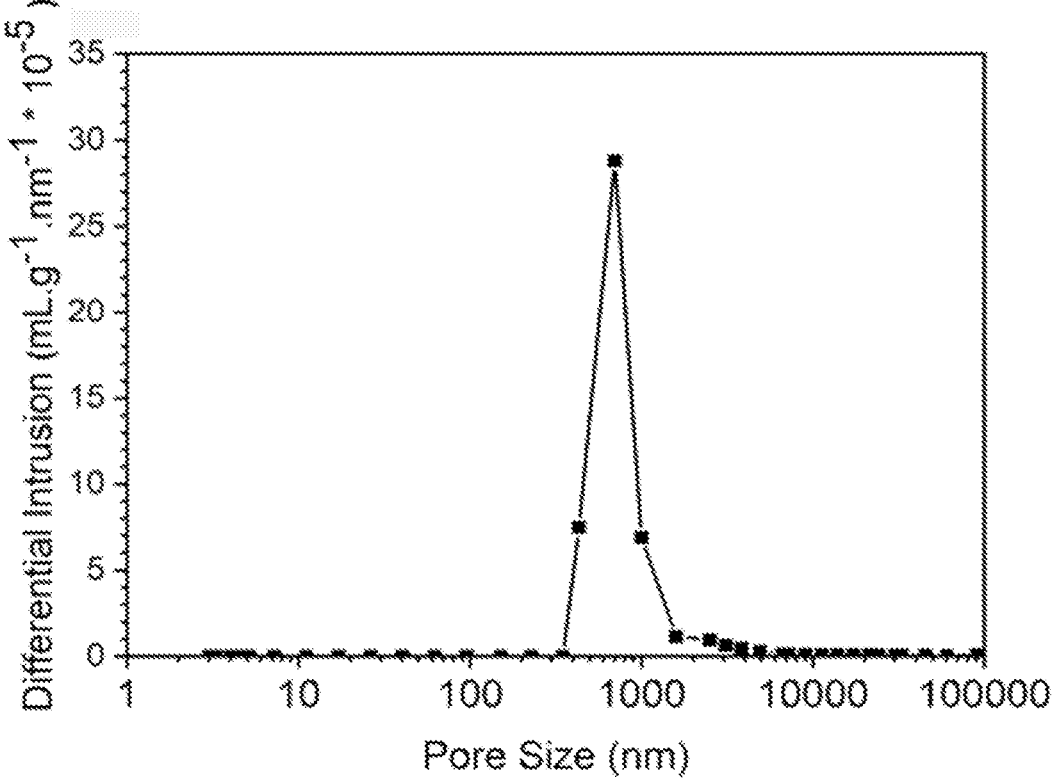
FIG. 5B shows a pore size distribution for the silicalite having the particle size distribution of FIG. 5A.

Silicalite particle size can be optimized to be around 1.5 µm-2.5 µm so that while performing the blade coating, these particles are positioned (e.g., interlocked) in the NMC electrode pores, which range in sizes from 2.5 µm to 2.8 µm. A particle size distribution of the silicalite is shown in FIG. 5A. Particle size optimization can facilitate a uniform coating of silicalite without excessive usage of the PVA binder, allowing the coated separator to form a homogenous and crack-free coating on the electrode surface to provide electrical isolation from the anode. FIG. 5B shows the pore-size distribution obtained from mercury intrusion porosimetry. The average pore size is around 700 nm, roughly ⅓ of the silicalite particle size. This pore size is sufficiently small to prevent localized short-circuiting when making the cell. The XRD peaks are representative of only silicalite, and the peaks for the NMC electrode are absent. Since the coating of silicalite is 40 µm thick, the presented XRD does not detect the underlying NMC electrode. This XRD pattern confirms that the synthesized silicalite has the required MFI type structure and that the electrode has been homogenously covered with the coating to prevent any contact of the anode with the cathode.

The aluminum foil coated sheet with 40 µm thick coating of silicalite and silica was cut into a sheet of 5 cm by 5 cm square to perform contact angle measurements, a sheet of PP with the same dimensions was also cut out for the same measurement. The contact angle measurement with the 5.3 M LiFSi/TMP electrolyte as the dropping liquid was done on DSA-25 Drop Shape Analyzer (Kruss, USA). The measurements were recorded as images at the initial contact (t=1 second) of the solvent with silica, silicalite and PP separators. The software electronically computed the contact angle and these values were confirmed by dropping the solvent at different spots of the coated sheet separator.

The salt-concentrated LiFSi/TMP electrolyte has dominant Li+-solvent interaction and very few free solvent molecules, reducing the volatility of the electrolyte and thus enhancing its safety. This electrolyte has a long cycle life due at least in part to an intrinsically robust salt-derived SEI associated with high concentration of lithium fluoride (LiF), which reduces the possibility of dendrite formation on the anode. This electrolyte also has a zero self-extinguishing time (SET) and can extinguish the external flames due to its ability to scavenge active hydrogen radicals to stop the combustion reaction. The flame extinguishing and retarding properties of the synthesized 5.3 M LiFSi/TMP electrolyte were experimentally confirmed.

Figure 6:
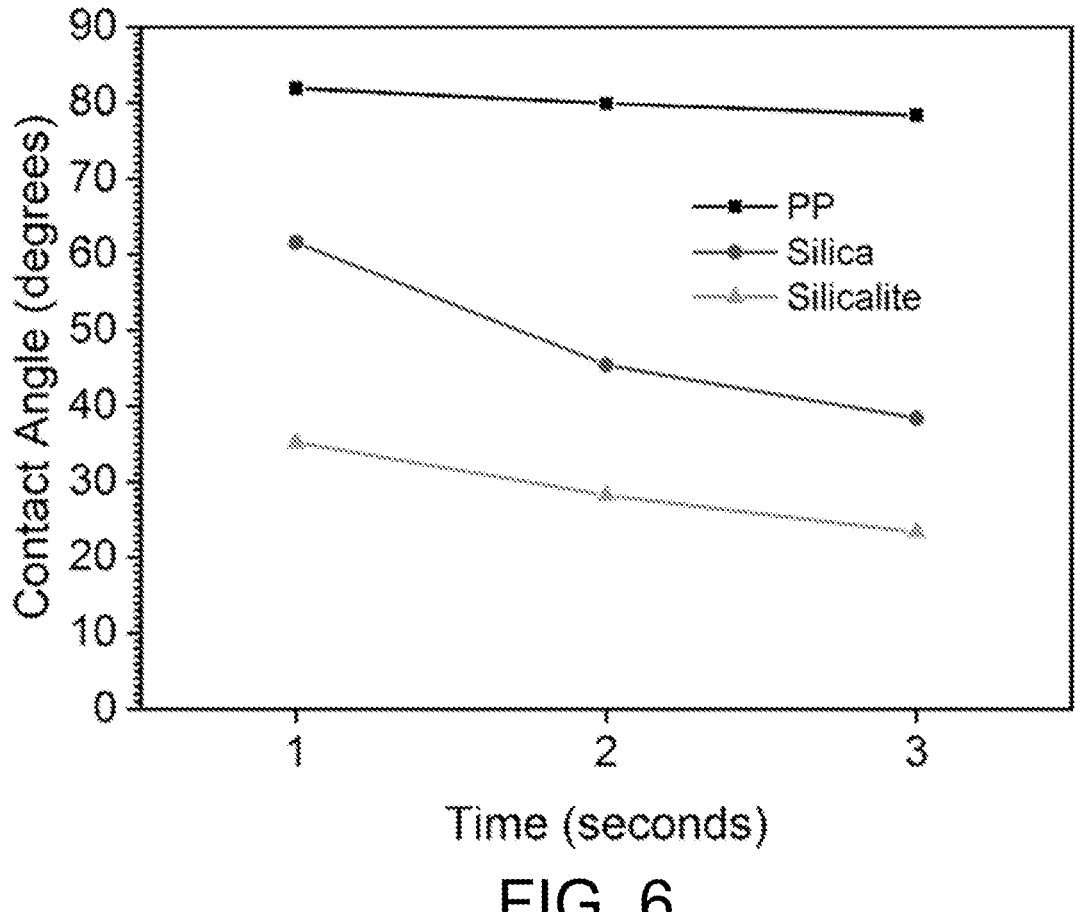
FIG. 6 shows contact angle as a function of time for a salt-concentrated electrolyte on silicalite, quartz silica, and polypropylene separators.

Single sessile drop wettability testing was done on the silicalite, quartz silica, and PP separator, using the 5.3M LiFSi/TMP electrolyte. The contact angle decreased with time at a much faster rate for the silicalite and silica separator as compared to the PP separator, due at least in part to their respective high surface energies. The drop of the electrolyte on the PP separator does not show a significant wetting/contact angle change, indicating the requirement of a larger wetting time for the separator. This change in the contact angle with time, quantified in FIG. 6, is consistent with the higher surface energies of the two inorganic separators relative to that of the PP membrane separator. In FIG. 6, the upper, middle, and lower traces represent polypropylene, silica, and silicalite, respectively. Another observation is that the silicalite membrane shows a higher wettability towards the electrolyte as compared to the silica separator. This leads to the conclusion that even with similar pore sizes (particle sizes) for the membrane separator, the intra-particle pores of the silicalite separator contribute to a better wettability and rate of uptake for the LiFSI/TMP electrolyte than quartz silica.

Electrochemical and high-temperature cycle performance of cells. Half cells of NMC/silicalite, NMC/quartz, and NMC/PP, filled with 5.3M LiFSI/TMP electrolyte, were prepared on lithium foil, and electrochemical performance was tested by EIS. The PP, silica, and silicalite cells were rested for 12 hours to wet the cell internals with the electrolyte, cycled for 10 cycles and then charged to a full charge state. Nyquist plots for the impedance of these three half cells suggest that all the separators have essentially same resistance. The silicalite separator has a lower value of SEI resistance as compared to PP separator and the silica separator. This is due at least in part to the better wettability of the silicalite separator to the LiFSI/TMP electrolyte, which results in better and more uniform availability of the electrolyte at the anode and separator interface, resulting in a thinner and more uniform SEI as compared to less wettable PP and silica separators. The charge transfer resistance for the silicalite separator also lower than that of the PP and silica separator. This can be attributed at least in part to the electrolyte being available inside the anode matrix more abundantly in the case of the silicalite separator, which leads to easier access to the anode surface for the lithium ions.

Full cells with NMC/silicalite, NMC/quartz and NMC/PP, with 5.3 M LiFSI/TMP electrolyte were constructed on commercial graphite anodes. These cells were cycled using the constant-current constant-voltage (CC-CV) method under the same conditions. Charge-discharge curves of the CC-CV test show that the silicalite cell retained about 15% more capacity compared to the PP separator after 100 cycles. This is due at least in part to the capacity being lost in the PP separator due to a higher SEI and charge transfer resistance. Also, the CC-CV curves for the silicalite separator show steeper voltage profile curves for the constant voltage phase of discharge verifying the reduced charge transfer resistance observed in the EIS results. The silica separator also lost more electrochemical capacity as compared to the silicalite separator, which confirms the role of the intra-particle pores of the silicalite particles contributing to a more uniform SEI, which in turn leads to less electrochemically active materials lost in the breakage and repair of the SEI.

The loss of capacity can be explained due to the non-uniform initial SEI formed on the graphite anode on the PP and silica separators, and graphite anode interface which is the resultant of a non-uniform charge distribution initiating from non-uniform availability of the electrolyte at the anode and separator interface. That is, the initial SEI formed on the silicalite separator and graphite interface is more uniform initially due at least in part to more uniform Li-ion flux, which is the resultant of the better electrolyte uptake, wettability, and intra-particle pores of the silicalite particles.

In the case of the PP and silica separators, due to the poor wettability, lesser electrolyte uptake, pore channels that are further apart, and non-wettable inter-pore surfaces, the Li-ion flux is less uniform. This leads to a non-uniform charge distribution and thus leads to a non-uniform initial SEI formation. The formed SEI on further cycling consumes more Li-ions in case of the PP and silica separator due to more formation and breakage, resulting from a higher stress due to its non-uniform structure. This is also shown in the resulting ATR-FTIR spectra, which shows that the absorbance peak of the SEI layer formed after cycling is higher for the PP and silica separator as compared to the silicalite separator. There is also greater peak broadening for the silicalite separator than the PP and silica separator, which is an indication of a denser SEI formation. The dense SEI absorbs less infrared light and reflects more, resulting in the different peak shape.

Cell-testing and SEI characterization. Disks of silicalite or silica coated electrodes of 16 mm diameter were cut from the corresponding coated electrode sheets and then kept in the vacuum oven at 70° C. for 12 hours. This disk was then immediately taken inside an argon-filled glovebox (Innovative Technology Inc., USA) and kept in it for a period of 24 hours to remove any traces of atmospheric gases or moisture in the electrode-supported separator disks. The other components of the cell were kept for assembly in the glovebox. The cut 16 mm electrode-supported separator disk was placed inside the bottom case of the CR-2032 cell and 150 µl of electrolyte 5.3 M LiFSI/TMP was pipetted onto the surface of the top facing silica/silicalite coated surface of the NMC electrode. A graphite electrode (MTI, USA), 16 mm diameter, was then carefully placed on top of the separator surface, so as to not damage the separator. Two spacers and one spring (X2 Labwares, Singapore) were then placed on the graphite anode followed by the placement of the top case of the CR-2032 cell to closely envelop the full-cell. The same procedure was used to make the full-cells with the PP-separator, where the electrolyte was introduced post the placement of the separator on the NMC electrode in the coin-cell.

The cell was then taken out and its charge and discharge characteristics were tested by a battery testing system (Neware Co., China). A standard CC-CV (constant current-constant voltage) method of testing the cells was adopted, with the minimum and maximum potential for testing kept at 2.5 volt and 4.5 volts. Electrochemical impedance spectroscopy (EIS) measurements of the assembled cells were conducted using PARSTAT 2263 EIS station (Princeton Applied Research, USA) in the AC mode. Nyquist plots for the assembled full cells were generated by utilizing a frequency range of 100 kHz to 100 mHz. Full cells constructed with separators using silica, silicalite and PP separators were respectively paired with the aforementioned LiFSI/TMP electrolyte. These cells were initially cycled at 0.1 C rate for 5 cycles to form a stable SEI layer at 25° C. in a temperature controlled chamber and then they were cycled 100 times at 0.5 C at 65° C. Cells with the 0.1 C rate cycling for 10 cycles, which had a stable SEI were disassembled inside the glovebox and the anode was washed with TMP. The washed anode was then allowed dry inside the glovebox for ~24 hours and then placed inside a sealed case. The anode was opened and then immediately tested for the thickness of the formed SEI using FTIR (Thermofisher Evolution) in the attenuated total reflectance mode (ATR mode) with a diamond crystal window. The test was done for three anodes with each of the silica, silicalite and PP separators to ensure repeatability and reliability of the experiment.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A lithium-ion battery separator comprising:
a substrate defining inter-particle pores; and
a zeolite coating on a surface of the substrate,
wherein the zeolite coating comprises silicalite particles, a porosity of the silicalite particles is between 35% and 40%, and the silicalite particles are hydrophobic and have an average particle diameter smaller than an average pore size of the inter-particle pores of the substrate, such that the silicalite particles are positioned in the inter-particle pores of the substrate.

2. The separator of claim 1, wherein the separator is non-flammable.

3. The separator of claim 1, wherein the substrate comprises a lithium nickel manganese cobalt oxide (NMC).

4. The separator of claim 1, wherein the average pore size of the inter-particle pores of the substrate is between about 2.5 µm and about 2.8 µm.

5. The separator of claim 1, wherein the silicalite particles comprise at least 99 atom % silicon.

6. The separator of claim 1, wherein the average particle diameter of the silicalite particles is between about 1.5 µm and about 2.5 µm.

7. The separator of claim 1, wherein the silicalite particles define inter-particle pores having an average pore size between about 600 nm and about 800 nm.

8. The separator of claim 1, wherein the silicalite particles define intra-particle pores having an average pore size between about 0.5 nm and about 0.6 nm.

9. The separator of claim 1, wherein the zeolite coating is formed directly on the surface of the substrate.

10. The separator of claim 1, wherein a thickness of the zeolite coating is in a range of 30 µm to 50 µm thick.

11. The separator of claim 1, wherein the zeolite coating comprises less than 1 wt % of organic components.

12. A method of making the lithium ion-separator of claim 1, the method comprising:
forming a slurry comprising the silicalite particles;
blade coating the slurry on the substrate; and
drying the slurry to yield the lithium-ion battery separator.

13. The method of claim 12,
wherein a metal content of the silicalite particles is at least 99 atom % silicon.

14. The method of claim 12, wherein the substrate comprises a lithium nickel manganese cobalt oxide (NMC).

15. A lithium-ion battery comprising:
the lithium-ion battery separator of claim 1, wherein the substrate is a first electrode;

a second electrode in direct contact with the zeolite coating; and an electrolyte in contact with the first electrode, the zeolite coating, and the second electrode.

16. The lithium-ion battery of claim 15, wherein the electrolyte is non-flammable.

17. The lithium-ion battery of claim 15, wherein the battery is non-flammable.

18. The lithium-ion battery of claim 16, wherein the electrolyte comprises a salt dissolved in a solvent.

19. The lithium-ion battery of claim 18, wherein the solvent comprises trimethyl phosphate (TMP), tris(trifluoroethyl) phosphate (TFEP), triethyl phosphate (TEP), dimethyl methyl phosphonate (DMMP), diethyl ethyl phosphonate (DEEP), or a combination thereof.

20. The lithium-ion battery of claim 18, wherein the salt comprises a carbonate.

21. The lithium-ion battery of claim 18, wherein the salt comprises lithium bis-fluoro sulphonyl imide (LiFSI).

* * * * *